UNITED STATES PATENT OFFICE 2,687,402

VULCANIZED POLYMERIC CYANOALKOXY-ALKYL ACRYLATES

George L. Wesp and Richard R. Morner, Dayton, Ohio, assignors to Monsanto Chemical Company, St. Louis, Mo., a corporation of Delaware No Drawing. Application December 17, 1951, Serial No. 262,180

4 Claims. (Cl. 260—79.5)

The present invention relates to new polymerization products.

An object of the invention is to prepare new nitrogenous polymers. Another object of the invention is to prepare improved synthetic rubbers.

We have found that valuable polymeric products may be obtained by subjecting to polymerizing conditions a cyano ether-ester having the formula

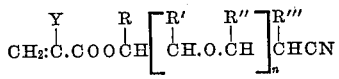

in which Y, R, R', R'' and R''' are selected from the class consisting of hydrogen and the methyl radical and $n$ is an integer of from 1 to 3.

Compounds having the above formula form the subject of the copending application of David T. Mowry and Eugene L. Ringwald, Serial No. 262,157, filed of even date. They are obtainable by contacting, in the presence of an esterifying agent, acrylic acid or methacrylic acid or an acid halide thereof such as acrylyl chloride or methacrylyl bromide with a hydroxy alkoxy nitrile having the formula

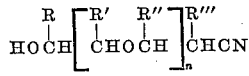

in which $n$, R, R', R'' and R''' are as defined above. Hydroxy alkoxy nitriles having this formula are easily obtainable by the addition of acrylonitrile or methacrylonitrile to alkylene glycols or to polyalkylene glycols having the formula

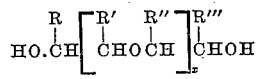

in which $x$ is 0, 1 or 2. As examples of useful hydroxyalkoxynitriles may be mentioned the 2-(2-hydroxyethoxy)propionitrile obtainable from ethylene glycol and acrylonitrile; the 2-(2-hydroxyethoxy)-1-methylpropionitrile obtainable from ethylene glycol and methacrylonitrile; the 2-(2-hydroxypropoxy)propionitrile obtainable from propylene-1,2-glycol and acrylonitrile; the 2-(2-hydroxy-1-methylpropoxy)propionitrile obtainable from 2,3-butylene glycol and acrylonitrile; the 2-[2-(2-hydroxyethoxy)ethoxy] propionitrile obtainable by reaction of diethylene glycol and acrylonitrile; and the hydroxy polyalkoxy-alkylene nitriles obtainable by reaction of such polyglycols as triethylene glycol or tripropylene glycol with acrylonitrile or methacrylonitrile.

Examples of cyano ether esters which may be polymerized to yield the present rubbers are 2-(2-cyanoethoxy)ethyl acrylate or methacrylate which is obtainable from acrylic acid or methacrylic acid and 2-(2-hydroxyethoxy)propionitrile; 2-(2-cyanopropoxy)ethyl acrylate or methacrylate which is obtainable from acrylic acid or methacrylic acid and 2-(2-hydroxyethoxy)-1-methylpropionitrile; 2-[2-(2-cyanoethoxy)ethoxy]ethyl acrylate or methacrylate which is obtainable from acrylic acid or methacrylic acid and 2-[2-(2-hydroxyethoxy)ethoxy] propionitrile; and 2-(2-cyanoethoxy)-1-methylethyl acrylate or methacrylate which is obtainable from acrylic of methacrylic acid and 2-(2-hydroxypropoxy)propionitrile, etc.

We have found that when the comparatively stable cyano ether-esters of the Mowry and Ringwald copending application referred to above are subjected to polymerizing conditions, they are readily converted into rubbery products which can be compounded with the well-known fillers such as carbon black, zinc oxide and the like, vulcanization agents such as sulfur, and vulcanization accelerators to produce highly valuable products. Vulcanized rubbers provided by the present invention are of particular utility in the fabrication of molded products designed for use in the automotive and other industries wherein there is required high resistance against hydrocarbon oils and greases, brake fluids, etc.

The new polymers may be prepared by any of the several polymerization methods known to the art, but the emulsion polymerization method is the most effective. In the practice of the emulsion polymerization technique monomers are contacted in the presence of water which contains dissolved therein a suitable peroxy catalyst and preferably an emulsion stabilizing agent. If desired all of the monomer may be charged to the polymerization reactor at the beginning of the reaction, or may be added periodically or or gradually throughout the course of the reaction. Similarly, the catalyst and emulsifying agent may also be introduced either at the start or in increments during the reaction. The preferred method of conducting the polymerization involves adding the monomer gradually to a reaction vessel maintained under the desired conditions for polymerization.

Emulsion polymerizations are catalyzed by means of any water soluble peroxy compound, for example sodium peroxide, hydrogen peroxide, sodium perborate, the sodium salts of other peroxy acids, the potassium, ammonium and other water soluble salts of peroxy acids, and any other water soluble compounds containing a peroxy radical. The quantity of peroxy compound may be from 0.05 to 2.0 per cent by weight of the polymerizable compound. The catalyst may be charged at the beginning of the reaction or it may be added continuously or in increments throughout the course of the reaction for the purpose of maintaining a more uniform concentration of catalyst in the reaction mass. The latter method is preferred because it tends to make the resultant polymer more uniform in physical and chemical properties.

Although the uniform distribution of the reactants throughout the reaction mass can be achieved by vigorous agitation alone, it is generally desirable to promote the uniform distribution of reagents by using wetting agents, or emulsion stabilizers. Suitable agents for this purpose are the water soluble salts of fatty acids, such as sodium oleate, and potassium stearate, mixtures of water soluble fatty acid salts, such as the common soaps prepared by the saponification of animal and vegetable oils, the "amino soaps" such as triethanolamine and dodecyl methyl amine, salts of rosin acids and mixtures thereof, the water soluble salts of half esters of sulfuric acid and long chain alkyl alcohols, sulfonated hydrocarbons, such as alkylarylsulfonates, and any other of the wide variety of wetting agents, which are in general organic compounds containing both hydrophobic and hydrophilic radicals. The quantity of emulsifying agent will depend upon the particular agent selected, the nature of monomer to be used, and the conditions of polymerization. In general, however, from 0.1 to 5 per cent by weight of the monomer may be employed.

The emulsion polymerization reactions are conducted at temperatures between 20 and 100° C., and preferably between 40–60° C. The polymerization temperatures should be maintained substantially constant, and the rate of addition of the monomer so regulated as to maintain this condition. Under such conditions the optimum quality of the product is obtained.

The reaction is preferably initiated by charging the reactor with water containing the catalyst and emulsifier in solution, and thereafter adding the monomer gradually at rates which enable the maintenance of a constant temperature. In order to avoid unduly high concentrations of emulsifier in the reaction mass at the beginning of the reaction most of it may be mixed with the monomer and added therewith during the reaction. Preferably, only a small proportion of the catalyst is charged at the beginning of the reaction and the remainder is added either continuously or intermittently throughout the course of the reaction. The preferred manner of operation involves heating the water containing a small amount of catalyst and emulsifier to approximately the ultimate polymerization temperature and initiating the reaction by introducing the stream of mixing monomers.

The emulsion polymerizations are conducted in glass or glass-lined vessels, which are provided with means for agitating the contents thereof. Generally, rotary stirring devices are the most effective means of insuring the intimate contact of the reagents, but other methods may successfully be employed, for example by rocking or tumbling the reactor. The polymerization equipment generally used is conventional in the art and the fundamental consideration involved in the selection of the equipment is the type of reaction contemplated.

The invention is further illustrated, but not limited, by the following examples:

Example 1

Into a reaction vessel equipped with a mechanical stirrer and adapted to a closed system there were charged 275 g. of water, 0.25 g. of an alkyl sulfate emulsifier known to the trade as Duponol ME and reported on page 4 of the August, 1945, issue of "Soap and Sanitary Chemicals" to be technical sodium lauryl sulfate, and 0.20 g. of sodium bisulfite. This charge was brought to a temperature of 41° C. in a nitrogen atmosphere, and then during a time of 1 hour there was added continuously 100 g. of 2-(2-cyanoethoxy)ethyl acrylate and 13 cc. of a catalyst mixture consisting of 25 g. of water, 0.04 g. of potassium persulfate and 0.75 g. of the emulsifier. During the next hour heating at about 40° C. was continued while another 12.5 g. portion of the catalyst mixture was introduced. The whole was then maintained at from 40–41° C., with stirring for an additional two hours. At the end of that time the resulting white emulsion was cooled and filtered to remove lumps. A soft, rubbery polymer was precipitated from the milky filtrate by addition of alcohol. The weight of the dried polymer was 86 g.

The resulting polymer was milled on cold rolls until a strippable sheet was formed (3.5 minutes). The sheet was then molded on press polish plates with a molding cycle consisting of a maximum temperature of 150° C. for 10 minutes and a cooling pressure of 500 p. s. i. Evaluation of the mechanical properties of the molded product employing American Society for Testing Materials procedures D638–46T, D412–41 and D445–46T and the Clash-Berg method for stiffness vs. temperature tests gave the following values:

| | |
|---|---|
| Ultimate strength | 144 p. s. i. |
| Total per cent elongation | 808. |
| Tensile product | 1308. |
| $T_f$ | −23.8° C. |
| $T_{2000}$ | −7.5° C. |
| Stifflex range | 16.3° C. |

Example 2

The polymer of Example 1 was compounded on cold rolls as follows:

| | Parts by weight |
|---|---|
| Polymer | 100.0 |
| Mercaptobenzothiazole | 0.5 |
| Zinc oxide | 10.0 |
| Stearic acid | 2.0 |
| Sulfur | 2.0 |
| Carbon black | 30.0 |
| Tetramethylthiuram disulfide | 1.0 |

Vulcanization of the compounded mixture was effected at 500 p. s. i. at 298° C. for 4 hours. Test specimens cut from the resulting vulcanizates had the following properties as determined by the evaluation procedures of Example 1.

| | |
|---|---|
| Ultimate strength | 614. |
| Total per cent elongation | 463. |
| Tensile product | 3438. |
| $T_f$ | −23.8° C. |
| $T_{2000}$ | −2.8° C. |
| Stifflex range | 21° C. |

The vulcanizate was found to be insoluble in all standard solvents, including carbon tetrachloride, hexane, gasoline and hydrocarbon oils.

The polymer in Example 2 was tested by

A. S. T. M. procedure D471–46T for resistance to degradation in several commercially available hydraulic fluids including some of the ester-based hydraulic fluids, and A. S. T. M. Oils No. 1 and No. 3 and reference oil 366, petroleum-based fluids. The vulcanized polymer was substantially unaffected by these fluids.

Although the invention has been described with respect to specific embodiment, it is not intended that the details thereof shall be construed as limitations upon the scope of the invention except to the extent incorporated in the following claims.

What we claim is:

1. A synthetic rubber composition comprising the sulfur vulcanized polymer of a cyano ether-ester having the formula

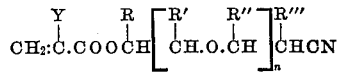

in which Y, R, R', R'' and R''' are selected from the class consisting of hydrogen and the methyl radical and $n$ is an integer of from 1 to 3.

2. A synthetic rubber composition comprising the sulfur vulcanized polymer of 2-(2-cyanoethoxy)ethyl acrylate.

3. The process of preparing a vulcanized synthetic rubber which comprises heating with sulfur a polymer of a cyano-ether ester having the formula

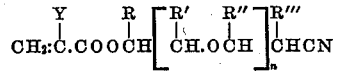

in which Y, R, R', R'' and R''' are selected from the class consisting of hydrogen and the methyl radical and $n$ is an integer of from 1 to 3.

4. The process of preparing a vulcanized synthetic rubber which comprises heating polymeric 2-(2-cyanoethoxy)ethyl acrylate with sulfur.

References Cited in the file of this patent

UNITED STATES PATENTS

| Number | Name | Date |
|---|---|---|
| 2,129,694 | Izard | Sept. 13, 1938 |